United States Patent
Waelde et al.

(10) Patent No.: US 11,243,108 B2
(45) Date of Patent: Feb. 8, 2022

(54) RADAR MEASURING DEVICE WITH PLANO-CONVEX LENS

(71) Applicant: VEGA GRIESHABER KG, Wolfach (DE)

(72) Inventors: Steffen Waelde, Niedereschach (DE); Levin Dieterle, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 59 days.

(21) Appl. No.: 16/778,976

(22) Filed: Jan. 31, 2020

(65) Prior Publication Data
US 2020/0256718 A1 Aug. 13, 2020

(30) Foreign Application Priority Data
Feb. 11, 2019 (EP) ..................................... 19156513

(51) Int. Cl.
| | | |
|---|---|---|
| *G01F 23/284* | (2006.01) | |
| *G01S 13/08* | (2006.01) | |
| *H01Q 13/02* | (2006.01) | |
| *H01Q 15/02* | (2006.01) | |

(52) U.S. Cl.
CPC ............ *G01F 23/284* (2013.01); *G01S 13/08* (2013.01); *H01Q 13/02* (2013.01); *H01Q 15/02* (2013.01)

(58) Field of Classification Search
CPC .................................................. G01F 23/284
See application file for complete search history.

(56) References Cited

U.S. PATENT DOCUMENTS

| | | | | |
|---|---|---|---|---|
| 4,566,321 A | * | 1/1986 | Zacchio ................ | G01F 23/284 73/290 R |
| 4,641,139 A | * | 2/1987 | Edvardsson .......... | G01F 23/284 342/124 |
| 4,670,754 A | * | 6/1987 | Zacchio ................ | G01F 23/284 342/124 |
| 5,594,449 A | * | 1/1997 | Otto ...................... | G01F 23/284 340/612 |
| 6,891,513 B2 | * | 5/2005 | Kienzle .................. | A61P 37/02 343/786 |

(Continued)

FOREIGN PATENT DOCUMENTS

| | | |
|---|---|---|
| DE | 40 25 326 A1 | 11/1991 |
| DE | 10 2005 036 846 A1 | 2/2007 |

(Continued)

OTHER PUBLICATIONS

Notice of Allowance dated Nov. 9, 2021 in Korean Application No. 10-2020-0013061 (with Computer Generated English Translation).

*Primary Examiner* — Peter M Bythrow
(74) *Attorney, Agent, or Firm* — Oblon, McClelland, Maier & Neustadt, L.L.P.

(57) ABSTRACT

A radar measuring device for level and/or limit level monitoring is provided, including a radar signal source configured to generate and/or transmit a radar signal, an antenna arrangement configured to direct the radar signal, a plano-convex lens with a plane side configured to face a medium and to focus the radar signal, the radar measuring device being configured such that the plane side rests at least partially on a container surface and such that a contact surface is formed between the plano-convex lens and the container.

17 Claims, 3 Drawing Sheets

(56) References Cited

U.S. PATENT DOCUMENTS

| | | | |
|---|---|---|---|
| 8,842,038 B2* | 9/2014 | Edvardsson | G01F 23/284 342/124 |
| 9,091,584 B2* | 7/2015 | Vogt | G01F 23/284 |
| 9,404,787 B2* | 8/2016 | Cheng | G01F 23/284 |
| 10,969,265 B2* | 4/2021 | Fredriksson | H01Q 1/225 |
| 2002/0126061 A1* | 9/2002 | Griessbaum | H01Q 13/02 343/786 |
| 2003/0167839 A1* | 9/2003 | Burger | G01F 23/284 73/290 V |
| 2007/0028684 A1 | 2/2007 | Benz | |
| 2007/0115196 A1* | 5/2007 | Motzer | H01Q 13/0208 343/786 |
| 2009/0178478 A1* | 7/2009 | Reimelt | H01Q 19/08 73/290 V |
| 2009/0212996 A1* | 8/2009 | Chen | G01F 23/284 342/124 |
| 2010/0031753 A1* | 2/2010 | Mayer | H01Q 19/062 73/861 |
| 2012/0169527 A1* | 7/2012 | Edvardsson | G01F 23/284 342/124 |
| 2012/0262331 A1* | 10/2012 | Kienzle | H01Q 1/225 342/124 |
| 2013/0099989 A1* | 4/2013 | Pantea | H01Q 19/08 343/783 |
| 2014/0004791 A1 | 1/2014 | Behrens et al. | |
| 2014/0047917 A1* | 2/2014 | Vogt | H01Q 19/062 73/290 V |
| 2015/0241261 A1* | 8/2015 | Cheng | H01Q 1/225 342/124 |
| 2016/0138957 A1* | 5/2016 | Blodt | H01Q 13/02 342/124 |
| 2017/0138778 A1* | 5/2017 | Falk | H01Q 19/08 |
| 2017/0141474 A1* | 5/2017 | Hengstler | G01F 23/284 |
| 2018/0106886 A1* | 4/2018 | Lin | G01S 13/88 |
| 2021/0143533 A1* | 5/2021 | Nagaishi | H01Q 21/08 |

FOREIGN PATENT DOCUMENTS

| | | |
|---|---|---|
| DE | 10 2012 016 120 A1 | 2/2014 |
| DE | 10 2016 217 614 A1 | 3/2018 |
| DE | 10 2016 218 162 A1 | 3/2018 |
| WO | WO 02/50954 A2 | 6/2002 |
| WO | WO 2018/050420 A1 | 3/2018 |

* cited by examiner

RADAR MEASURING DEVICE WITH PLANO-CONVEX LENS

CROSS-REFERENCE TO RELATED APPLICATIONS

This application claims the benefit of the filing date of European Patent Application No. 19 156 513.4 filed on 11 Feb. 2019, the entire content of which is incorporated herein by reference.

TECHNICAL FIELD

The invention relates to a radar measuring device for level and/or limit level monitoring, a method for mounting a radar measuring device and a radar measuring arrangement.

BACKGROUND

In process automation, a wide range of radar sensors are used to determine the filling level and/or the limit level. In some applications, a radar sensor may be used to measure through a vessel wall. This may be done with radar sensors which are placed at a defined distance from the vessel to determine the level or limit level in the vessel. The distance between the antenna of the radar sensor and the vessel is selected so that the vessel is in the far field of the antenna. This may have the particular advantage that an approximately flat wave front is formed before the wave penetrates the container wall. This arrangement may have a large space requirement due to the required distance between the radar sensor and the vessel wall, so that space and/or arrangement problems may arise, especially in applications where space is limited, such as in mobile vessel applications.

SUMMARY

The embodiments described below may provide for improved radar measuring in an advantageous manner.

One aspect is related to a radar measuring device for level and/or limit monitoring, which comprises a radar signal source which is set up to generate, transmit and/or receive a radar signal. In addition, the radar measuring device comprises an antenna arrangement that is configured to direct the radar signal. Furthermore, the radar measuring device comprises a plano-convex lens with a plane side, which may face a fill medium in a container, and which is designed to focus the generated radar signal. The plane side of the plano-convex lens is designed as a contact surface to rest on a surface of the container during a measurement of the level and/or limit level of the product in the container.

An advantage may be that the radar measuring device has a significantly reduced extension length, since the lens may be placed directly on the container and is therefore not located at a predetermined distance from the container wall. This may save installation space, which may be used for further components. In addition, the radar measuring device can be mounted much easier, because the radar measuring device can be mounted directly on the vessel by means of a connection through the flat side of the plano-convex lens. In particular, an adhesive connection may make it possible to attach the radar measuring device to the container without any further aids. Although the high-frequency characteristics of the radar measuring system may be influenced by direct mounting on the outer wall of the vessel, advantages of direct mounting as well as direct contact may be superior to possible disadvantages.

The radar signal source is in particular a semiconductor chip, which comprises a radar signal generator and a radar antenna. The radar signal source may also be an alternative design capable of generating, transmitting and/or receiving a radar signal. In addition, the radar signal source may be designed to receive a radar signal, in particular the radar antenna is designed to both transmit and receive the radar signal.

In addition, the radar measuring device may include an antenna arrangement, which is designed to align a radar signal so that the reflection characteristics as well as the side lobe suppression can be significantly improved. The antenna array can be attached directly to the radar signal source and can accommodate the plano-convex lens on the other side of the antenna array. The antenna arrangement may be designed to direct both the transmitted radar signals and the received radar signals.

Furthermore, the radar measuring device may have a plano-convex lens, which has a plane side that may face the product. The plano-convex lens can be designed to focus the aligned radar signal. In addition to the flat side, the plano-convex lens can also have a convex side. The convex side of the lens may protrude into the antenna array. In addition, the plano-convex lens may have a flat side which is designed to rest at least partially on a container. In particular, the flat side of the plano-convex lens may be designed to be fixed to the container so that the plano-convex lens holds the entire radar measuring device to the container. The plano-convex lens can form a contact surface between the plano-convex lens and the container by placing the flat side of the plano-convex lens flat on the container. The flat side of the plano-convex lens may also have a slight curvature so that a continuous contact surface is created between the plano-convex lens and the container if the latter has a round cross-section. Alternatively, the radar measuring device may be designed to rest at least partially on a container on the flat side of the plano-convex lens and to provide a contact surface between the plano-convex lens and the container. The radar measuring device can also be placed on the outside or inside of the container. Alternatively, the radar measuring device can also be placed on and/or in a pipe, bypass or similar.

According to an exemplary embodiment, the plano-convex lens may be attached to the container by means of a force-fit, form-fit, and/or positive substance jointing connection, in particular with an adhesive joint, so that the radar measuring device is attached to the container. The antenna arrangement may be a planar antenna, a planar antenna with horn antenna, and/or a horn antenna. As an example, the radar measuring device may be fixed to the container with a double-sided adhesive tape or similar adhesives. For example, the plano-convex lens can be attached to the container by means of a screw or press connection. Likewise, the plano-convex lens can be arranged positively on the container h means of a bayonet lock. In addition, the plano-convex lens can be attached to the container by means of a material connection, such as ultrasonic welding or friction welding. An advantage of this design fora may be that the radar measuring device can be quickly and easily contacted to the vessel by means of a material-locking connection, thus reducing the installation time and thus the costs.

According to an exemplary embodiment, the plano-convex lens may be made of the same material, in particular a plastic composite, as at least part of the container. For example, both the plano-convex lens and the container can be made of high density polyethylene (HDPE). Alternative plastics, which have a similar permittivity to HDPE, are also conceivable. In addition, the plastic composite can also have reinforcing elements such as short glass or carbon fibres. The container may be made entirely and/or partly of a plastic composite. Advantageously, the part of the container can be made of the same material as the plano-convex lens, so that at the contact surface on the plano-convex lens and the container both components are made of the same material. The advantage of this arrangement may be that by adjusting the permittivity of the two components, the reflection properties and sidelobe suppression are improved, since particularly small impedance jumps are present.

According to an exemplary embodiment, the antenna arrangement may comprise a horn antenna, whereby a convex side of the plano-convex lens may have a diameter corresponding to a maximum inner diameter of the horn antenna. The lens can have a convex side, which can be rotationally symmetrical. The convex side of the plano-convex lens can protrude into the horn antenna so that the circumference of the convex side corresponds to the maximum inner diameter of the horn antenna. The antenna arrangement can also be formed by a horn antenna. This may be particularly useful for focusing the radar signals, since the entire available area of the horn antenna and/or the plano-convex lens is used and thus a uniform focusing of the radar signals can take place.

According to an exemplary embodiment, the ratio of the surface area of the convex side of the plano-convex lens to the flat side of the plano-convex lens may be between 0.5 and 5. The surface of the convex side and/or the flat side can be an area Which is specified in $mm^2$ and/or $cm^2$. The amount of surface area of the convex side can thus be set in relation to the surface area of the flat side of the plano-convex lens. The ratio can be between 0.5 and 5. The relationship between the surface of the convex side and the flat side can describe in particular a curvature of the convex side. Preferably, the ratio between the convex side and the plano-convex side can be between 0.8 and 3, and particularly preferred between 0.9 and 2. At the ratio between 0.9 and 2, surprisingly, a significant improvement in reflection properties and sidelobe suppression was found.

According to an exemplary embodiment, the radar measuring device may comprise a housing, in which the antenna array and/or the radar signal source is located. In addition, the housing may have at least one underside, the underside being at least partially formed and/or imageable by the plano-convex lens. In addition, the underside may rest at least partially on the container. In other words, the radar measuring device may have a housing in which the antenna array and/or the radar signal source can be located and the housing can be mounted on the vessel. The bottom of the housing is formed by the plano-convex lens, so that the flat side of the plano-convex lens can lie against the container. This can have the advantage that the housing can be placed directly on the container and therefore no further auxiliary means is required. In addition, a functional integration can take place, since the plano-convex lens both focuses the radar signal and attaches all components of the radar measuring device to the vessel.

According to an exemplary embodiment, the plano-convex lens may be made of the same material as the rest of the housing. In other words, the housing and the plano-convex lens can be made of the same material, e.g., a plastic composite, so that both components can be joined together using a welding process such as ultrasonic welding. Alternatively, the components of the radar measuring device can also be manufactured in one piece using a multi-component injection moulding process. This can have the advantage that by matching the materials to each other, a joining process and/or the assembly is shortened or simplified overall, thus resulting in cost savings. The one-piece form can also contribute to the tightness of the radar measuring device.

According to an exemplary embodiment, a lens heel may at least partially surround the convex side of the plano-convex lens. In addition, the lens heel may be parallel to the flat side of the plano-convex lens, with the lens heel forming at least part of the underside. In other words, the side of the plano-convex lens that also includes the convex side may have an additional lens step that is parallel to the flat side. The lens heel can also form part of the bottom of the housing, increasing the contact area between the plano-convex lens and the container. This may have the advantage that in an antenna arrangement that does not cover the entire underside of the housing, the lens heel can completely form the underside of the housing.

According to an exemplary embodiment, the housing may be filled with a filling compound, in particular with a potting compound, whereby the filling compound can be designed to protect the antenna array and/or the radar signal source from moisture. In other words, the housing can be completely filled with a filling compound, such as a foam or gel, after the antenna array and/or signal radar source has been mounted, so that all components inside the housing are protected from moisture. This can have the advantage that the radar measuring device can also be used in demanding environments, such as severe weather conditions. For example, the filling compound or casting compound can be used for radar measuring devices which require explosion protection approval.

According to an exemplary embodiment, the radar measuring device may have an energy storage which may be designed to supply the radar measuring device with energy permanently. The energy storage device is preferably a lithium-ion battery or a comparable energy storage device, which can preferably also be charged inductively. The energy storage can also be located in the housing. The advantage of this design may be that the radar measuring device can also operate autonomously, so that it does not depend on an external power source.

According to an exemplary embodiment, the antenna arrangement and the plano-convex lens may be connected and/or connectable by means of a form-fit, force-fit and/or material connection. In one version, the plano-convex lens can be attached to the antenna array by means of an adhesive joint. Alternatively, a screw connection, a bayonet lock or a frictional connection, such as a screw connection, can be used. The advantage of this design can be that the lens and the antenna arrangement are not connected to each other until the plano-convex lens is mounted, so that, for example, the plano-convex lens can form the bottom of the housing.

According to an exemplary embodiment, the force-fit, form-fit, and/or positive substance jointing between the antenna assembly and the plano-convex lens may have a seal which is designed to prevent any contamination and/or moisture from penetrating the antenna assembly and/or the radar signal source. The seal can be provided on the outside of the antenna array as well as on the inside of the antenna array. The plano-convex lens may have a recess in which the seal can be placed so that when the plano-convex lens is mounted on the antenna assembly, the seal is formed between the antenna assembly and the plano-convex lens. The seal can be an O-ring or similar. The advantage of this design may be that the tightness of the connection between the plano-convex lens and the antenna array is improved, so that the inside of the antenna array as well as that of the plano-convex lens is protected against contamination and/or moisture, thus ensuring an increased service life of the radar measuring device.

According to an exemplary embodiment, the antenna arrangement and the plano-convex lens may be designed rotationally symmetrical. Both the antenna arrangement and the plano-convex lens can be rotationally symmetrical. Alternatively, the antenna, arrangement and the plano-convex lens can be designed rotationally symmetrical to each other. The advantage of a rotationally symmetrical design of the antenna array and the plano-convex lens may be that mounting the plano-convex lens to the antenna array can be simplified.

Another aspect relates to a method for mounting a radar measuring device, in particular a device as described above and below. The method may include the step of forming a bond, in particular by means of an adhesive, between a flat surface of a lens of the radar measuring device and a container. In other words, a flat surface of a lens of a radar measuring device is applied directly to a container. In one design example, the connection can be made between the lens and the container using an adhesive or self-adhesive tape. Alternatively, the connection between the lens and the container can be formed by means of an ultrasonic welding process. The advantage of this design can be that the direct contact saves assembly time and the radar arm measuring device can be positioned in places that are difficult to access with the aid of a tool.

Another aspect relates to a radar measuring arrangement, which comprises a radar measuring device as described above and below. In addition, the radar measurement assembly may include a container designed to contain a medium. The radar measuring device may rest at least partially on the container surface and form a contact surface. In addition, the container may not have a recess and/or receiving device on the contact surface. In other words, the radar measuring device can be mounted on the vessel, thus forming a contact surface between the radar measuring device and the vessel, the vessel having no recess or receptacle on or at the contact surface. This may have the advantage that the vessel does not have to be modified for mounting the radar measuring system, which can reduce the mounting time as well as the mounting effort.

In addition, the radar measuring arrangement may include a radar measuring device and a container, which have at least partially a substantially equal permittivity at their contact surface. In this context, an essentially equal permittivity means a deviation of the permittivity by plus/minus 100% to the permittivity of the radar measuring device, in particular the plano-convex lens. The advantage of this design can be that impedance jumps as small as possible occur, which leads to improved reflectivity and/or side lobe suppression.

In the following, further embodiments are described with reference to the figures.

BRIEF DESCRIPTION OF THE DRAWINGS

The figures are merely schematic and not true to scale. In the figures, identical, equal-acting or similar elements are provided with the same reference signs.

DETAILED DESCRIPTION OF EMBODIMENTS

Figure 1:
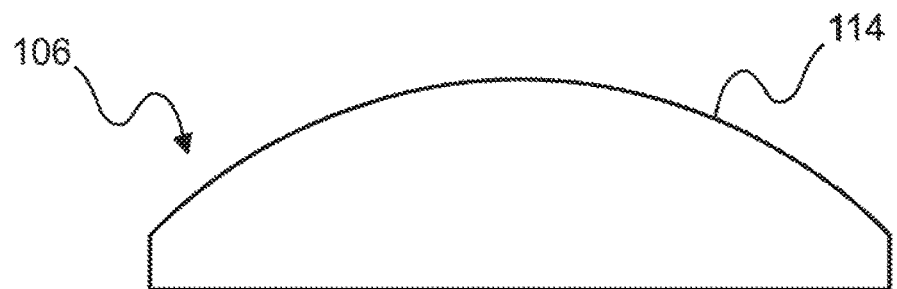
FIG. 1 shows a schematic section through a plano-convex lens according to an embodiment.

FIG. 1 shows a plano-convex lens 106 according to an embodiment. The plano-convex lens 106 has a flat side 110 and a convex side 114 opposite the flat side. The flat side 110 can be fixed to a container 108. The convex side 114 can be fixed to an antenna array 104.

Figure 2:
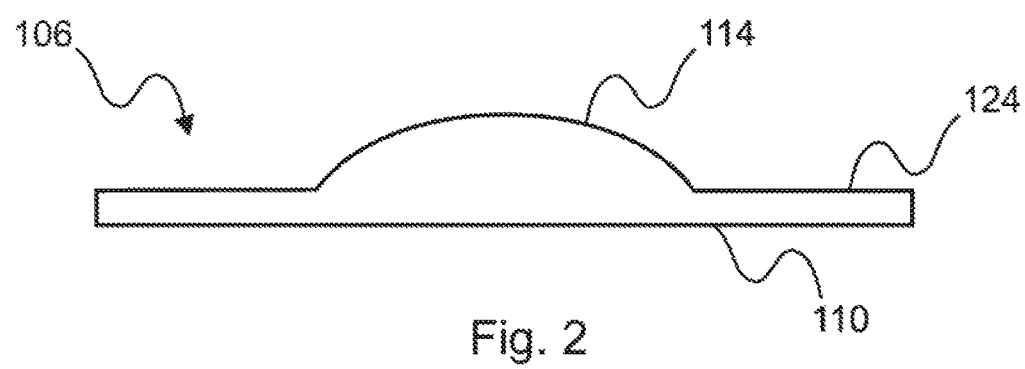
FIG. 2 shows a schematic section through a plano-convex lens according to an embodiment.

FIG. 2 shows a plano-convex lens 106 according to an embodiment. The plano-convex lens 106 has a flat side 110 and a convex side 114. In addition, the plano-convex lens 106 has a lens heel 124 (or lens step 124) which extends around the plano-convex side 114. In this case, the lens heel 124 can form a surface for fixing the radar measuring device 100 to a container 108.

Figure 3:
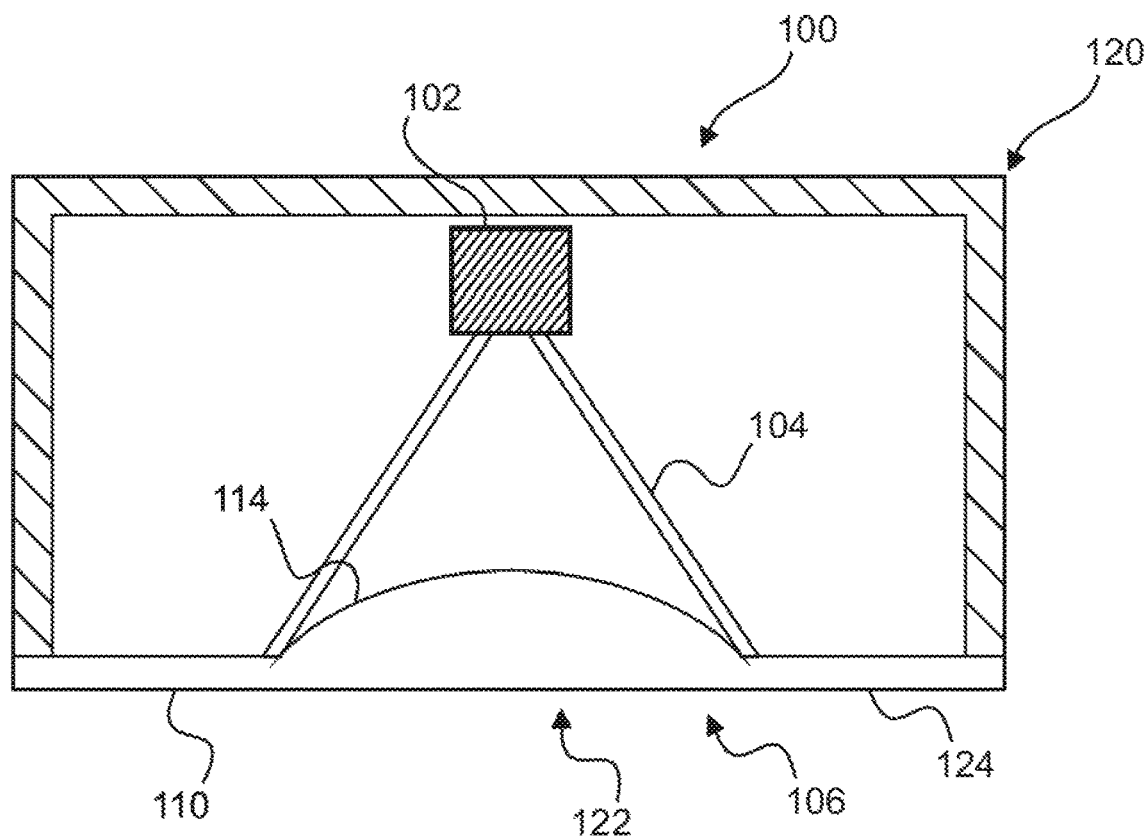
FIG. 3 shows a schematic sectional view of a radar measuring device according to an embodiment.

FIG. 3 shows a radar measuring device 100 according to an embodiment. The radar measuring device 100 has a radar signal source 102 on which an antenna array 104 is arranged. The plano-convex lens 106 is arranged at the antenna array 104. The plano-convex lens 106 has a flat side 110 and a convex side 114. The convex side 114 projects into the antenna array 104. In addition, the radar unit 100 has a housing 120. The housing 120 has a bottom side 122, which is formed by the flat side 110 of the plano-convex lens 106. The flat side 110 of the plano-convex lens 106 has a lens step 124, which also forms part of the lower side 122.

Figure 4:
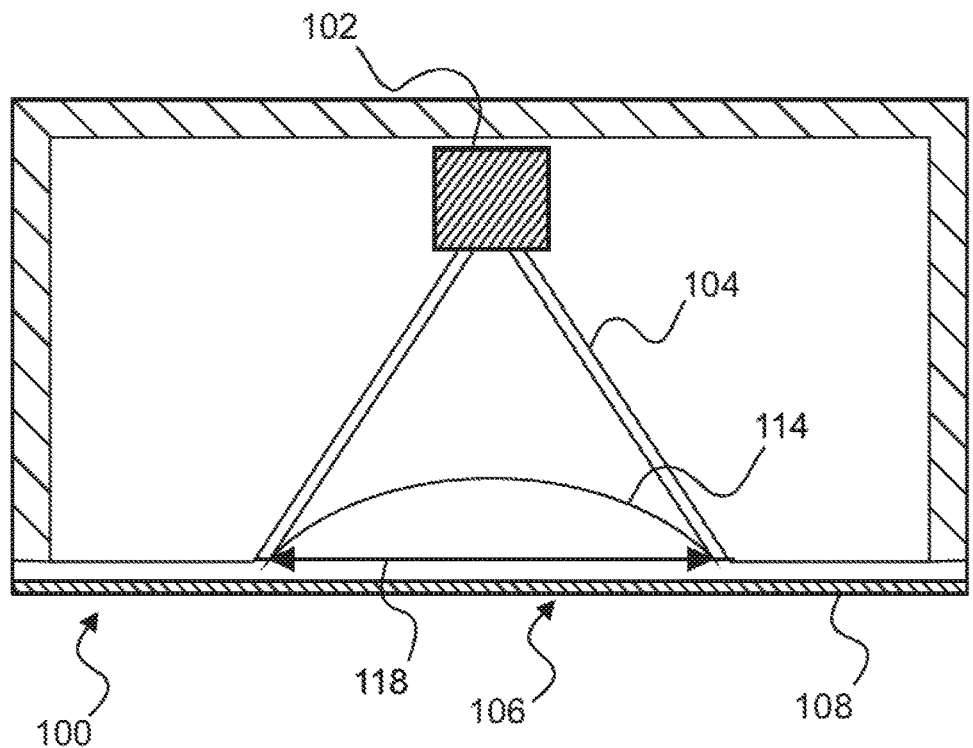
FIG. 4 shows a schematic sectional view of a radar measuring device according to an embodiment.

FIG. 4 shows a radar measuring device 100 according to an embodiment. The radar measuring device 100 has a radar signal source 102 on which an antenna array 104 is arranged. The plano-convex leers 106 is attached to the antenna array 104. The plano-convex lens has a convex side 114, which has the same diameter as a maximum inner diameter 118 of the antenna arrangement 104. In addition, the radar measuring device 100 is mounted on a vessel 108 (or a container 108), whereby the plano-convex lens 106 rests flat on the vessel 108. In particular, the connection between the plano-convex lens 106 and the container 108 can be made by an adhesive joint.

Figure 5:
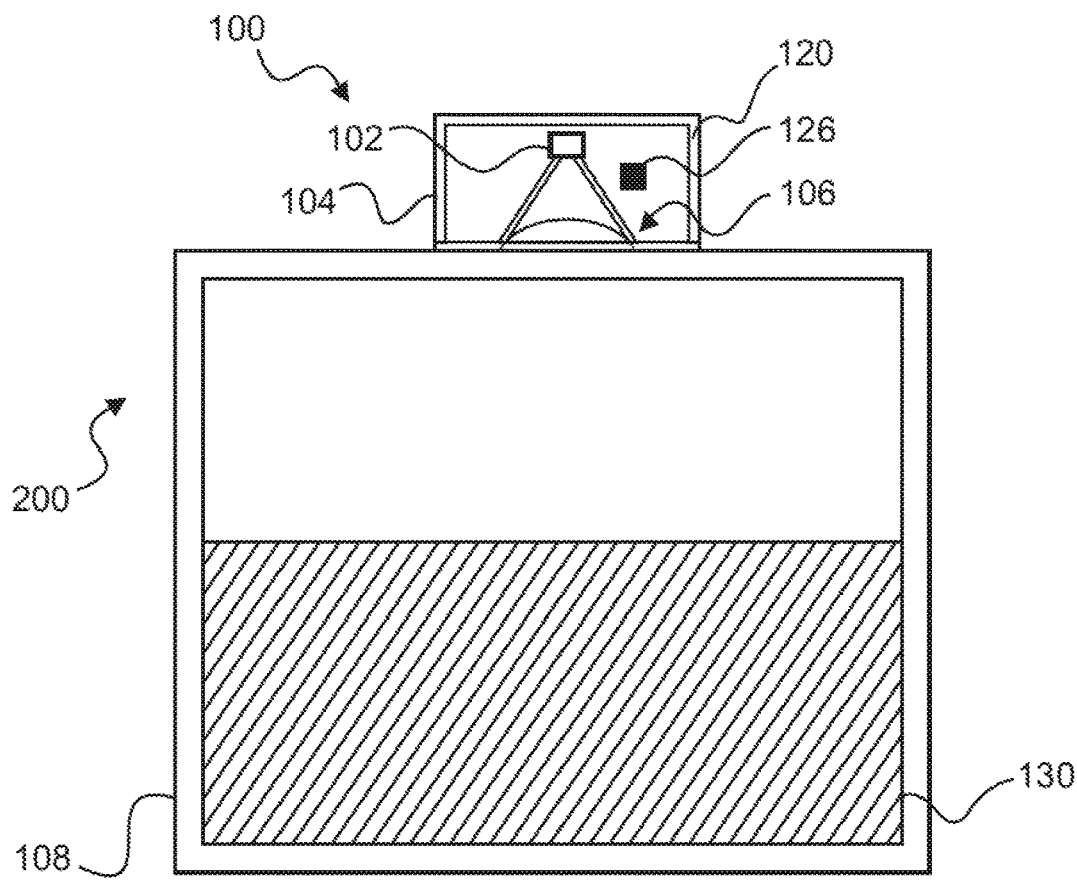
FIG. 5 shows a schematic sectional view of a radar measuring arrangement according an embodiment.

FIG. 5 shows a radar measuring arrangement 200, which has a radar measuring device 100 as well as a container 108, which holds a medium 130. The radar measuring device 100 is arranged on the container 108 by means of the plano-convex lens 106. The plano-convex lens 106 is part of the housing 120 of the radar measuring device 100. Radar measuring device 100 also has a radar signal source 102 on which an antenna array 104 is mounted. In addition, the radar measuring device has an energy storage 126 for the energy supply of the radar measuring device 100, which is also arranged in the housing 120 of the radar measuring device 100.

Figure 6:
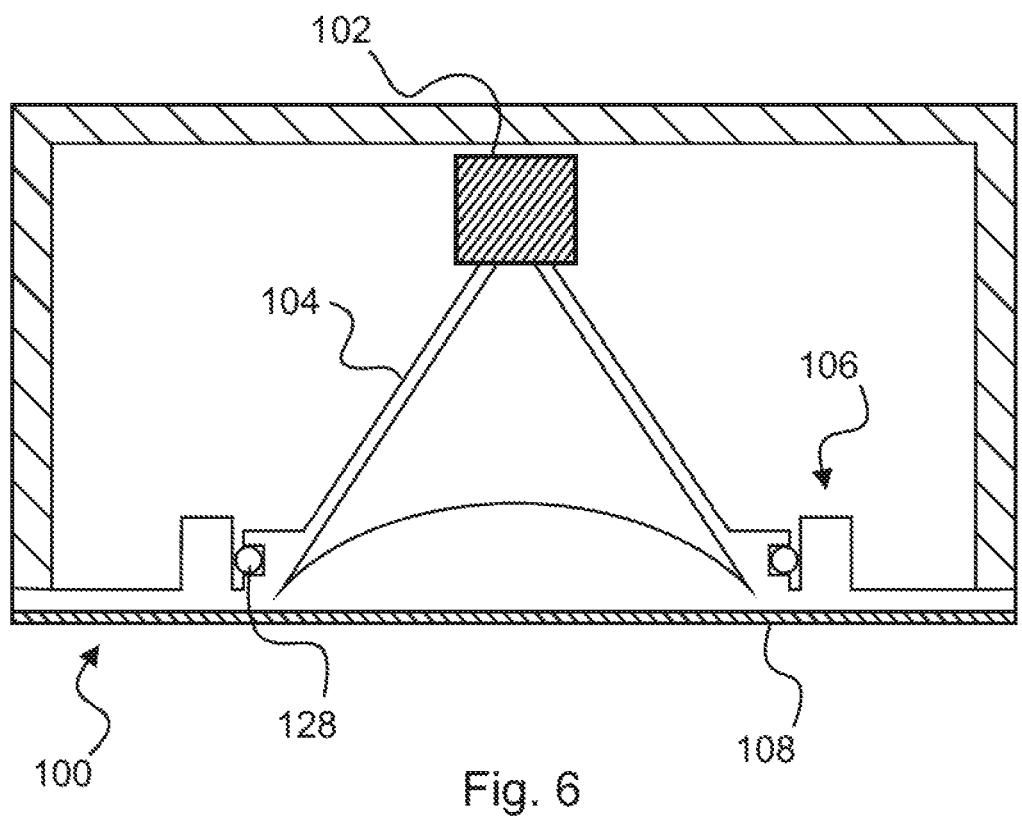
FIG. 6 shows a schematic sectional view of a radar measuring device according to an embodiment.

FIG. 6 shows a radar measuring device 100 according to an embodiment. The radar measuring device 100 has a plano-convex lens 106 which is designed to be mounted on a gasket 128 which is attached to the antenna array 104. The radar measuring device 100 also has a radar signal source 102. The gasket 128 is preferably placed between the plano-convex lens 106 and the antenna array 104, so that no moisture or impurities get into the antenna array 104. In addition, the radar measuring device 100 is arranged on the container 108 by means of the plano-convex lens 106.

Figure 7:
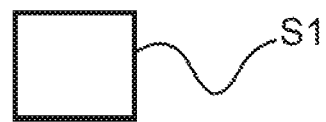
FIG. 7 shows a flowchart illustrating the steps of a method for assembling a radar measuring device according to an embodiment.

FIG. 7 shows a flowchart illustrating the steps of a method for mounting a radar measuring device 100 according to an embodiment. Unless otherwise described, the radar measuring device 100 comprises the same elements and features as the radar measuring device in FIGS. 1 to 6.

In step S1 a connection is formed between a flat surface 110 of a lens of the radar measuring device 100 and a container 108. This connection can be made in particular by using an adhesive or a force-fit, form-fit, and/or positive substance jointing connection.

In addition, it should be noted that comprising and 'having' do not exclude other elements and the indefinite articles 'an' or 'a' do not exclude a multitude. It should also be noted that features described with reference to one of the above embodiment may also be used in combination with other features of other embodiments described above. Reference signs in the claims are not to be regarded as restrictions.

The invention claimed is:

1. A radar measuring device for level monitoring and/or for limit level monitoring, comprising:
    a radar signal source configured to generate, transmit, and receive a radar signal;
    an antenna arrangement comprising a horn antenna configured to direct the radar signal;
    a plano-convex lens with a plane side and a convex side, wherein the plane side is configured:
        to face a medium and to focus the radar signal, and
        as a contact surface in order to rest on a surface of a container during measurement of a level of a filling material in the container and/or of a limit level of a filling material in the container, and
    wherein the convex side protrudes into the horn antenna of the antenna arrangement; and
    a housing having at least one underside at least partially formed by the plano-convex lens,
    wherein the antenna arrangement is disposed in the housing.

2. The radar measuring device according to claim 1, wherein the plano-convex lens is further configured to be attached to the container by a force-fit, or by a form-fit, or by a positive substance jointing connection, so that the radar measuring device is attached to the container.

3. The radar measuring device according to claim 2, wherein the plano-convex lens is further configured to be attached using an adhesive connection.

4. The radar measuring device according to claim 1, wherein the plano-convex lens is made of a same material as at least part of the container.

5. The radar measuring device according to claim 4, wherein the same material is a plastic composite.

6. The radar measuring device according to claim 1, wherein the convex side of the plano-convex lens has a diameter that equals a maximum inner diameter of the horn antenna.

7. The radar measuring device according to claim 6, wherein a ratio of a surface area of the convex side of the plano-convex lens to the plane side of the plano-convex lens is between 0.5 and 5.

8. The radar measuring device according to claim 1, wherein the radar signal source is arranged in the housing.

9. The radar measuring device according to claim 8, wherein the plano-convex lens is made of a same material as the housing.

10. The radar measuring device according to claim 6,
    wherein a lens step at least partially circumferentially surrounds the convex side of the plano-convex lens,
    wherein the lens step is formed parallel to the plane side of the plano-convex lens, and
    wherein the lens step forms at least part of at least one underside of a housing of the radar measuring device.

11. The radar measuring device according to claim 8, wherein the housing is filled with a filling compound, which is configured to protect the antenna arrangement and the radar signal source from moisture.

12. The radar measuring device according to claim 1, further comprising an energy storage device configured to supply the radar measuring device with energy.

13. The radar measuring device according to claim 1, wherein the antenna arrangement and the plano-convex lens are connected and/or connectable by a force-fit, or by a form-fit, or by a positive substance jointing connection.

14. The radar measuring device according to claim 13, wherein the force-fit, the form-fit, the positive substance jointing connection between the antenna arrangement and the plano-convex lens comprises a seal, which is configured to prevent contamination or moisture from penetrating into the antenna arrangement or into the radar signal source.

15. A method of mounting a radar measuring device according to claim 1 on a container, the method comprising:
    forming a joint with an adhesive, between a flat surface of the plano-convex lens of the radar measuring device and the container.

16. A radar measurement arrangement, comprising:
    a radar measuring device according to claim 1; and
    a container configured to receive a medium,
    wherein the radar measuring device rests at least partially on the container and forms a contact surface, and
    wherein the container has no recess or receiving device on the contact surface for mounting the radar measuring device.

17. The radar measuring arrangement according to claim 16, wherein the radar measuring device and the container have a same permittivity at the contact surface.

* * * * *